United States Patent [19] [11] 4,075,279
Holst et al. [45] Feb. 21, 1978

[54] PROCESS FOR THE MANUFACTURE OF SWELLABLE CELLULOSE ETHERS

[75] Inventors: Arno Holst; Michael Kostrzewa, both of Wiesbaden, Germany

[73] Assignee: Hoechst Aktiengesellschaft, Germany

[21] Appl. No.: 726,000

[22] Filed: Sept. 23, 1976

[30] Foreign Application Priority Data

Sept. 27, 1975 Germany .............................. 2543187

[51] Int. Cl.² ....................... C08B 11/00; C08B 15/10
[52] U.S. Cl. .................................. 536/88; 128/290 R; 128/296; 536/57; 536/87
[58] Field of Search ....................... 536/56, 57, 88, 87; 428/274; 128/296, 290 R

[56] References Cited

U.S. PATENT DOCUMENTS

| 2,026,865 | 1/1936 | Campbell et al. ....................... 536/56 |
| 2,150,205 | 3/1939 | Cochran et al. ........................ 536/56 |
| 3,589,364 | 6/1971 | Dean et al. ............................. 162/146 |
| 3,732,867 | 5/1973 | Money ................................. 128/290 R |
| 3,758,457 | 9/1973 | Broeck et al. .......................... 536/56 |
| 3,884,907 | 5/1975 | Laurance et al. ........................ 264/37 |
| 3,936,441 | 2/1976 | Holst et al. ............................. 536/88 |
| 3,939,836 | 2/1976 | Tunc ................................... 128/296 |
| 3,976,074 | 8/1976 | Fitzgerald et al. ..................... 128/296 |

Primary Examiner—Ronald W. Griffin
Attorney, Agent, or Firm—James E. Bryan

[57] ABSTRACT

This invention relates to an improvement in the process for the manufacture of water-absorbing, but largely water-insoluble cellulose ethers, wherein cellulose is etherified with a halogen fatty acid in an alkaline medium to which organic solvents may be added, to such an extent that without a further reaction a water-soluble cellulose ether would be produced, and wherein, prior to, during, or after etherification, a further reaction is carried out with a cross-linking agent which is polyfunctional towards cellulose in an alkaline reaction medium, the improvement comprising that chips of regenerated cellulose film are used as cellulose.

3 Claims, No Drawings

PROCESS FOR THE MANUFACTURE OF SWELLABLE CELLULOSE ETHERS

The present invention relates to a process for the manufacture of water-absorbing, but largely water-insoluble cellulose ethers, wherein cellulose is etherified with a halogen fatty acid in an alkaline medium, to which organic solvents may be added, to such an extent that, without a further reaction, a water-soluble cellulose ether would be produced, and wherein prior to, during, or after etherification, a further reaction is carried out with a cross-linking agent which is polyfunctional towards cellulose in an alkaline reaction medium.

Cellulose ethers of this type may be used for various purposes, for example as absorbing materials or as additives to absorbing materials in medical or hygienic bandages, or as dehydrating means, for example in aqueous emulsions.

Processes for the manufacture of cross-linked or modified cellulose ethers are known from German Offenlegungsschriften Nos. 1,912,740, 2,357,079, and 2,358,150. The starting materials used for these processes are sheeted, purified wood pulp, cotton, rayon fibers, and cellulose. The resulting products are wholly or at least predominantly insoluble in water, but are capable of retaining relatively large quantities of water and of swelling thereby. Suitable cross-linking agents are, for example, epoxy compounds, halohydrins, epichlorohydrin, polychlorinated higher alcohols, divinyl sulfone, acid chlorides, or those compounds in which the group which is polyfunctional towards cellulose is either
the acrylamido group

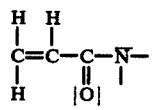

or the chloro azomethine group

or the allyloxy azomethine group

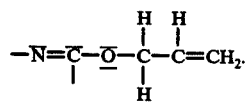

In some cases, the absorptive materials produced have the drawback that they absorb water only slowly or retain it too strongly.

It is the object of the present invention to produce cellulose ethers which are cross-linked according to known processes, but which absorb water very quickly and also pass it on readily, a combination which usually must be realized by adding adjuvants.

For achieving this object, use is made of the process described in German Offenlegungsschrift No. 2,357,079; alternatively, a process may be employed in which an alkaline medium containing no isopropanol, specifically an aqueous-alkaline medium, is used. The cellulose is used in the form of chips of regenerated cellulose film which may be coated with a lacquer.

In plants where regenerated cellulose film (e.g. Cellophane ®) is manufactured, scrap is obtained (trimmings, defective batches) which is preferably used as the starting material, for reasons of economy. In addition to untreated films, films are also produced in these plants which are coated on one or both surfaces with lacquers to adapt them to specific applications, e.g. to make them water-resistant. Depending upon the market situation, the proportion of unlacquered to lacquered regenerated cellulose films produced may correspond, for example, to a ratio of 30 : 70. Recycling of part of this scrap is thus possible.

In order to obtain good yields during etherification and cross-linking, the films are chopped and ground. An average particle size of about 1.5 to 2 mm was found to be advantageous. Comminuting the film results in an increased surface, and particularly in the case of lacquered films, ensures that the compounds reacting with the cellulose during the reactions are capable of acting on the regenerated cellulose.

The process according to the present invention is preferably conducted in such a manner that the ground chips of regenerated cellulose film are mixed, advantageously at room temperature, with an about 15 to 50 percent by weight aqueous NaOH solution, to which an organic solvent may be added, if desired, and that etherification and cross-linking are then performed at a temperature in the range of about 40° to 90° C, preferably at about 50° to 60° C. Depending upon the conditions prevailing, the etherification and cross-linking reactions proceed for about 0.5 to 3 hours.

The products obtained in accordance with the present invention are distinguished in that the structure of the products swollen with water differs from the structures of hitherto known swellable cellulose ethers. Their gel-like, water-swollen particles are transparent, the degree of transparency being higher when unlacquered cellulose films are used than in the case of lacquered materials.

The products obtained according to the present invention absorb water very rapidly and are capable of a good water transfer.

In the following examples, percentages are by weight. The table lists the parameters determined from the products produced in accordance with the examples. The abbreviations have the following meanings:

WRV = water retention capacity in percent by weight, measured against 2000-times the acceleration of gravity and based on the water-insoluble portion of the total product, WUA = water-insoluble portion of the total product, $SV_{NaCl}$ = absorption capacity for 1 percent NaCl solution in percent by weight, calculated on the total product.

The WRV value is determined after immersion of the sample in water. The $SV_{NaCl}$ value is determined after the sample has absorbed 1 percent NaCl solution up to the point of saturation.

EXAMPLE 1

86 g of ground chips of unlacquered regenerated cellulose film (about 0.5 mole) are kneaded in a 1 liter capacity kneader with 240 g of aqueous isopropanol (87%). 80 g of a 50 percent aqueous NaOH solution (1.0 mole) are added drop-by-drop, and the mass is alkalized for 30 minutes at a temperature of approximately 25° C. 47.3 g of an 80 percent by weight aqueous solution of monochloroacetic acid (0.4 mole) are added dropwise to this mixture and at the same time 2 g (0.01 mole) of solid bis-acrylamido acetic acid are added. Etherification and cross-linking proceed at 60° C for about 1 hour, while the mass is constantly kneaded. The reaction mixture is taken up in 1 liter of aqueous methanol (80%), neutralized with chloroacetic acid, using phenolphthalein as the indicator, filtered, and the residue is washed three times with 80% by weight methanol, and dried at 60° C.

EXAMPLE 2

Ground chips of a regenerated cellulose film coated with a nitro lacquer are reacted as in Example 1.

EXAMPLE 3

42 g of ground chips of a regenerated cellulose film coated with a polyvinylidene chloride lacquer (approximately 0.25 mole) are alkalized for 30 minutes at about 25° C in a horizontal paddle mixer with 84 g of a 50 percent by weight aqueous NaOH solution (1.05 mole) to which 120 g of aqueous isopropanol (87%) are added. 59 g of an 80 percent by weight aqueous monochloroacetic acid solution (0.5 mole) are added to the mixture and the mass is etherified for 1 hour at 60° C. 5 g of bis-acrylamido-acetic acid (0.025 mole) are then added and the mixture is cross-linked for 30 minutes at 60° C. The reaction mixture is diluted with 1 liter of aqueous methanol (80%), neutralized with glacial acetic acid (using phenolphthalein as the indicator), filtered, the residue is washed with 80% by weight methanol, and the resulting brownish product is dried at 60° C.

EXAMPLE 4

The procedure corresponds to that described in Example 3, except that a mixture of 70 percent by weight of ground chips of nitro-lacquered regenerated cellulose film and 30 percent by weight of ground chips of polyvinylidene chloride-lacquered regenerated cellulose film is used. The mixing ratio used in this example is of the order which may be obtained in some production plants.

EXAMPLE 5

42 g of ground chips of unlacquered regenerated cellulose film (approximately 0.25 mole) are alkalized for 30 minutes with 35.7 g of a 28 percent by weight aqueous NaOH solution (0.25 mole) in a 1 liter capacity kneader. A mixture consisting of 23.3 g of the sodium salt of monochloroacetic acid (0.2 mole) and 1 g of bis-acrylamidoacetic acid (0.005 mole) is added and the reaction mixture is maintained for 60 minutes at a temperature of 60° C. The mass is then diluted with 1 liter of aqueous methanol (80%), neutralized against phenolphthalein by adding glacial acetic acid, filtered, the residue is washed three times with 80 percent by weight methanol, and finally dried at 60° C.

EXAMPLE 6

The procedure described in Example 5 is repeated, except that a mixture consisting of 70 percent by weight of ground chips of nitro-lacquered regenerated cellulose film and 30 percent by weight of ground chips of polyvinylidene chloride-lacquered regenerated cellulose film is used.

EXAMPLE 7

At about 25° C and while thoroughly agitating, 172 g (approximately 1 mole) of ground chips of unlacquered regenerated cellulose film are alkalized for 30 minutes in a horizontal paddle mixer with 220 g of an 18.2 percent aqueous solution of NaOH (1 mole). 44 g of a 10 percent aqueous solution of bis-acrylamidoacetic acid (approximately 0.02 mole) are dropwise added and the mixture is cross-linked for 60 minutes at 50° C while constantly agitating. Then 93.2 g of the sodium salt of monochloroacetic acid (0.8 mole) are added with agitation and the mixture is etherified for one hour at 60° C. The reaction product is suspended in 1 liter of aqueous methanol (80%), neutralized against phenolphthalein by adding glacial acetic acid, filtered, the residue is washed three times with 80 percent by weight methanol, and finally dried at 60° C.

EXAMPLE 8

The procedure described in Example 5 is repeated, except that a mixture consisting of 30 percent by weight of ground chips of unlacquered regenerated cellulose film and 70 percent by weight of ground chips of lacquered regenerated cellulose film is used. The lacquered portion consists of 70 percent by weight of nitro-lacquered material and 30 percent by weight of polyvinylidene chloride-lacquered material.

EXAMPLE 9

At a temperature of about 25° C, 42 g of ground chips of unlacquered regenerated cellulose film (0.25 mole) are alkalized for 30 minutes with 150 g of a 28% by weight aqueous NaOH solution (1.05 mole) in a 1 liter kneader. 1.16 g of epichlorohydrin (0.0125 mole) are dropwise added and the mixture is cross-linked for 30 minutes at 60° C. After cross-linking, 59 g of an 80 percent monochloroacetic acid solution (0.5 mole) are added drop-by-drop and the mixture is etherified for 60 minutes at 60° C. It is then diluted with 1 liter of aqueous methanol (80%), neutralized against phenolphthalein by adding glacial acetic acid, filtered, the residue is washed three times with methanol (80%), and finally dried at 60° C.

TABLE

| Example No. | WRV % | WUA % | $SV_{NaCl}$ % |
|---|---|---|---|
| 1 | more than 10,000 | 34 | 2,300 |
| 2 | more than 10,000 | 69 | 1,700 |
| 3 | 4,000 | 75 | 1,770 |
| 4 | 6,800 | 57 | 1,800 |
| 5 | more than 10,000 | 46 | 1,620 |
| 6 | 1,200 | 60 | 830 |
| 7 | 2,900 | 83 | 980 |
| 8 | more than 10,000 | 40 | 2,040 |
| 9 | 9,600 | 61 | 1,570 |

It will be obvious to those skilled in the art that many modifications may be made within the scope of the present invention without departing from the spirit thereof, and the invention includes all such modifications.

What is claimed is:

1. In the process for the manufacture of water-absorbing, but largely water-insoluble cellulose ethers, wherein cellulose is etherified with a halogen fatty acid in an alkaline medium to which organic solvents may be added, to such an extent that without a further reaction a water-soluble cellulose ether would be produced, and wherein, prior to, during, or after etherification, said further reaction is carried out with a cross-linking agent which is polyfunctional towards cellulose in an alkaline reaction medium, the improvement comprising that chips of regenerated cellulose film are used as cellulose.

2. A process according to claim 1 in which the chips are of regenerated cellulose film coated with a nitro lacquer or a polyvinylidene chloride lacquer.

3. A process according to claim 1 in which the crosslinking agent is selected from the group consisting of epoxy compounds, halohydrins, epichlorohydrin, polychlorinated higher alcohols, divinyl sulfone, acid chlorides and those compounds in which the group which is polyfunctional towards cellulose is either the acrylamido group, the chloro azomethine group, or the allyloxy azomethine group.

* * * * *